United States Patent
Xie (10) Patent No.: US 11,586,246 B2
(45) Date of Patent: Feb. 21, 2023

(54) METHOD AND APPARATUS FOR PROVIDING NOTIFICATION REGARDING WEARABLE DEVICE

(71) Applicant: Beijing Xiaomi Mobile Software Co., Ltd., Beijing (CN)

(72) Inventor: Yan Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 468 days.

(21) Appl. No.: 16/693,727

(22) Filed: Nov. 25, 2019

(65) Prior Publication Data

US 2020/0409409 A1 Dec. 31, 2020

(30) Foreign Application Priority Data

Jun. 28, 2019 (CN) .......................... 201910572715.7

(51) Int. Cl.
  *G06F 1/3212* (2019.01)
  *G06F 1/16* (2006.01)
  *H04W 4/02* (2018.01)
  *H04W 12/33* (2021.01)
  *H04W 12/63* (2021.01)

(52) U.S. Cl.
  CPC ............ *G06F 1/163* (2013.01); *G06F 1/1694* (2013.01); *G06F 1/3212* (2013.01); *H04W 4/025* (2013.01); *H04W 12/33* (2021.01); *H04W 12/63* (2021.01)

(58) Field of Classification Search
  CPC ...... G06F 1/1694; G06F 1/163; G06F 1/3212; H04W 4/025
  See application file for complete search history.

(56) References Cited

U.S. PATENT DOCUMENTS

| | | | |
|---|---|---|---|
| 9,939,784 B1 * | 4/2018 | Berardinelli | H04M 1/72412 |
| 10,008,039 B1 * | 6/2018 | Neustein | G06T 11/001 |
| 10,169,978 B1 | 1/2019 | Brooks et al. | |
| 10,227,003 B1 | 3/2019 | Sanchez et al. | |
| 10,317,200 B1 * | 6/2019 | Han | G01B 11/26 |
| 10,874,348 B1 * | 12/2020 | Han | A61B 5/6843 |
| 2002/0145522 A1 | 10/2002 | Pembroke | |
| 2012/0190305 A1 | 7/2012 | Wuidart | |
| 2015/0262458 A1 | 9/2015 | Faaborg et al. | |

(Continued)

FOREIGN PATENT DOCUMENTS

| | | |
|---|---|---|
| CN | 104661176 A | 5/2015 |
| CN | 105278686 A | 1/2016 |

(Continued)

OTHER PUBLICATIONS

Notice of Reasons for Refusal for Japanese Application No. 2019-561316, dated Nov. 2, 2021.

(Continued)

*Primary Examiner* — Andrea C Leggett
(74) *Attorney, Agent, or Firm* — Finnegan, Henderson, Farabow, Garrett & Dunner, L.L.P.

(57) ABSTRACT

A method for providing a notification, includes: determining whether a wearable device is worn by a user; obtaining usage status information of the wearable device when the wearable device is unworn by the user; determining whether to send the notification based on the usage status information of the wearable device; and sending the notification when a predefined condition is met.

13 Claims, 5 Drawing Sheets

(56) References Cited

U.S. PATENT DOCUMENTS

| | | | | |
|---|---|---|---|---|
| 2015/0310788 | A1* | 10/2015 | Park | G09G 3/20 |
| | | | | 345/173 |
| 2015/0341903 | A1 | 11/2015 | Jeong et al. | |
| 2015/0362977 | A1* | 12/2015 | Doniwa | H04L 63/0861 |
| | | | | 713/324 |
| 2016/0026212 | A1* | 1/2016 | Lee | G06F 1/3231 |
| | | | | 361/679.03 |
| 2016/0065723 | A1* | 3/2016 | Jung | G06F 3/0484 |
| | | | | 340/586 |
| 2016/0364560 | A1* | 12/2016 | Yan | G06F 21/32 |
| 2017/0039358 | A1* | 2/2017 | Yuen | G09B 5/02 |
| 2017/0280223 | A1* | 9/2017 | Cavarra | G06F 1/1694 |
| 2017/0303129 | A1* | 10/2017 | Boettcher | H04M 1/66 |
| 2017/0366657 | A1* | 12/2017 | Thompson | H04W 76/14 |
| 2018/0322768 | A1* | 11/2018 | Kingsbury | G08B 21/24 |
| 2019/0231280 | A1* | 8/2019 | Tudor | A61B 5/7455 |

FOREIGN PATENT DOCUMENTS

| | | |
|---|---|---|
| CN | 105680892 A | 6/2016 |
| CN | 106301443 A | 1/2017 |
| CN | 107510441 A | 12/2017 |
| CN | 108924364 A | 11/2018 |
| EP | 3 007 415 A1 | 4/2016 |
| EP | 3 188 569 A1 | 7/2017 |
| JP | 2017/174162 A | 9/2017 |
| KR | 20170061104 A | 6/2017 |
| WO | WO 2014/048994 A2 | 4/2014 |

OTHER PUBLICATIONS

English version of International Search Report Issued in Application No. PCT/CN2019/108661, dated Mar. 26, 2020, 2 pages.
Office Action of Korean Application No. 10-2019-7033030, dated Mar. 22, 2021.
First Office Action of Russian Application No. 2019139725/28 dated Jul. 30, 2020.
Extended European Search Report in European Application No. 19212604.3, dated Jun. 9, 2020.
International Search Report in International Application No. PCT/CN2019/108661, dated Mar. 26, 2020.
Office Communication for European Application No. 19 212 604.3, dated May 20, 2022.

* cited by examiner

METHOD AND APPARATUS FOR PROVIDING NOTIFICATION REGARDING WEARABLE DEVICE

CROSS-REFERENCE TO RELATED APPLICATIONS

The present application is based upon and claims priority to Chinese Patent Application No. 201910572715.7, filed on Jun. 28, 2019, the entire content of which is incorporated herein by reference.

TECHNICAL FIELD

The present disclosure relates to wearable device technologies, and more particularly to a method and an apparatus to provide a notification regarding a wearable device.

BACKGROUND

At present, the application of wearable devices is very popular, such as smart watches, bracelets, belts and so on. However, users often take off and lose wearable devices for various reasons.

Therefore, there is a need for a method for preventing a wearable device from being lost due to being taken off.

SUMMARY

According to a first aspect of the embodiments of the present disclosure, a method for providing a notification, includes: determining whether a wearable device is worn by a user; obtaining usage status information of the wearable device when the wearable device is unworn by the user; determining whether to send the notification based on the usage status information of the wearable device; and sending the notification when a predefined condition is met.

According to a second aspect of the embodiments of the present disclosure, an apparatus for providing a notification, includes: a processor; and a memory storing instructions executable by the processor, wherein the processor is configured to: determine whether a wearable device is worn by a user; obtain usage status information of the wearable device when the wearable device is unworn by the user; determine whether to send the notification based on the usage status information of the wearable device; and send the notification when a predefined condition is met.

According to a third aspect of the embodiments of the present disclosure, a non-transitory computer readable storage medium has stored thereon instructions that, when executed by a processor of a device, cause the device to perform a method for providing a notification, the method including: determining whether a wearable device is worn by a user; obtaining usage status information of the wearable device when the wearable device is unworn by the user; determining whether to send the notification based on the usage status information of the wearable device; and sending the notification when a predefined condition is met.

With the technical solution provided by the embodiments of the present disclosure, once it is determined that the wearable device is not worn by the user, a reminder message is sent to the user to prevent the wearable device from being lost. Therefore, when the wearable device is taken off in a public place and is not worn for a long time or the remaining power is low, the wearable device is prevented from being left and lost in the public place by sending a reminder message to the user.

The above general description and the following detailed description are intended to be illustrative and not restrictive.

BRIEF DESCRIPTION OF THE DRAWINGS

The accompanying drawings, which are incorporated in the description and form a part of the description, illustrate embodiments of the disclosure and explain the principles of the disclosure together with the description.

DETAILED DESCRIPTION

Exemplary embodiments will be described in detail herein, examples of which are illustrated in the accompanying drawings. When the following description refers to the drawings, same numbers in different drawings refer to the same or similar elements. The embodiments described in the following exemplary embodiments do not represent all embodiments consistent with the present invention. Instead, they are merely examples of devices and methods consistent with aspects of the invention as recited in the appended claims.

When a user uses a wearable device, the wearable device is often taken off for various reasons. When the wearable device is not taken off by the user at home or in the workplace, for example, when it is taken off in a public place, it is often lost due to the user forgetting to bring it.

Embodiments of the present disclosure provide a method to remind the user in various forms to prevent the wearable device from being lost when it is detected that the user takes off the wearable device and it is determined that a reminder condition is met. The wearable device may be a smart watch, a wrist ring, a wrist band, a pair of smart glasses, and the like.

Figure 1:
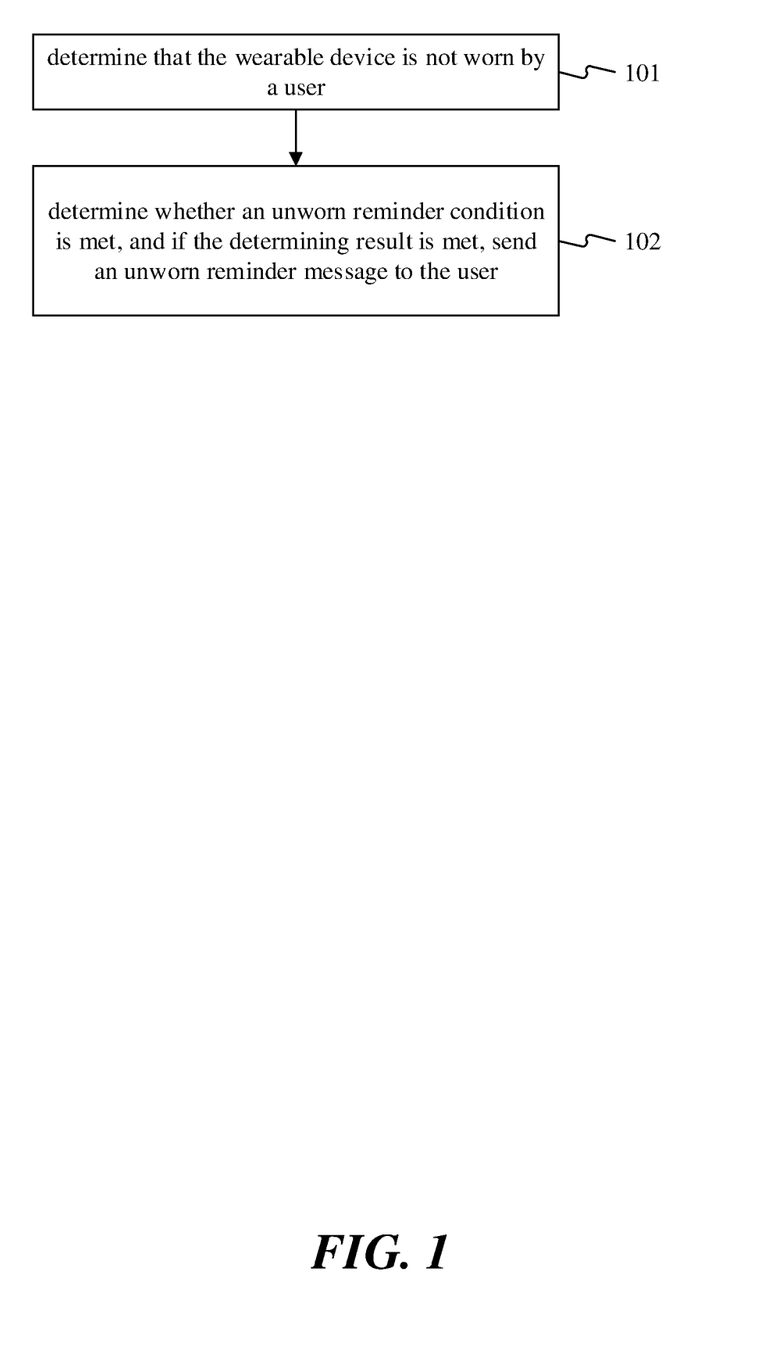
FIG. 1 is a flowchart of a method for providing a notification regarding a wearable device, according to an exemplary embodiment.

FIG. 1 is a flow chart of a method for providing a notification regarding a wearable device, according to an exemplary embodiment. The method can be applied to a wearable device, or to a smart terminal associated with the wearable device. The smart terminal can be a mobile phone, a PAD, a computer, a multimedia player, and the like. The association between the wearable device and the smart terminal is usually implemented by means of a wireless connection, such as wireless connection through Bluetooth, WIFI, SIM card, and the like. As shown in FIG. 1, the method may include the following steps.

In step 101, it is determined that the wearable device is not worn by a user.

In step 102, it is determined whether a predefined condition, referred to herein as an unworn reminder condition, is met, and if the unworn reminder condition is met, sending an unworn reminder message to the user.

In the embodiment, when the wearable device is not worn by the user and the unworn reminder condition is met, the unworn reminder message is sent to the user, and the wearable device may be prevented from being lost. In addition, if it is determined that the unworn reminder condition is not met, the unworn reminder message will not be sent to the user.

In the embodiment, a biometric parameter of the user is monitored to determine whether the wearable device is worn by the user.

In an embodiment, determining whether the unworn reminder condition is met in step 102 includes the following steps.

In a first step, usage status information of the wearable device is obtained.

In a second step, it is determined whether the unworn reminder condition is met based on the usage status information.

In an embodiment, the usage status information includes at least one of the following: a current geographic location, a currently-remaining power parameter value, or an unworn duration.

In an embodiment, the current geographic location may be obtained by a positioning device (for example, GPS, Beidou satellite, etc.) on the wearable device. In an embodiment, the current geographic location may be obtained through a smart terminal associated with the wearable device. Thus, when the positioning device is not provided in the wearable device, the geographical location of the wearable device can also be obtained. The following describes in detail how to obtain the current geographic location of the wearable device through the smart terminal associated with the wearable device.

(1) When it is determined that the wearable device is not taken off, the current geographic location of the smart terminal is used as the current geographic location of the wearable device;

(2) When it is determined that a fixing member of the wearable device is changed from a fixed state to an unfixed state, that is, when the device is being taken off, the current geographic location of the smart terminal is used as the current geographic location of the wearable device;

(3) When it is determined that the wearable device has been taken off, the geographical location of the wearable device which has been recorded when the wearable device was taken off, is obtained as the current geographical location of the wearable device. In this manner, when it is determined that the wearable device is taken off, the current geographic location of the smart terminal associated with the wearable device is recorded as the geographic location of the wearable device when taken off. The recorded geographical location may be stored in the wearable device or may be stored in the associated smart terminal.

The currently-remaining power parameter value is a parameter indicating the remaining power, and may be, for example, a currently-remaining power value or a currently-remaining power percentage. The currently-remaining power parameter value can be obtained directly from the wearable device. The unworn duration refers to the duration in which the wearable device is not worn. The unworn duration can be obtained by the following ways: when it is detected that the fixing member of the wearable device is being changed from the fixed state to the unfixed state, determining that the wearable device is taken off at this time, and then recording the time that the wearable device is taken off; when the unworn duration of the wearable device is obtained, the duration from the time when the wearable device is taken off to the time of obtaining is calculated as the unworn duration. It should be noted that the time when the wearable device is taken off is the time that is recorded when the wearable device is taken off at the last time.

In an embodiment, determining whether the unworn reminder condition is met based on the usage status information includes: obtaining a set of security locations, and determining whether the current geographic location is included in the set of security locations; and if it is not included, when determining that the unworn duration is greater than the set duration threshold, determining that the unworn reminder condition is met, or when determining that the currently-remaining power parameter value is less than the set power parameter threshold, determining that the unworn reminder condition is met.

The set of security locations may include one or more security locations set by the user, such as home, office, and the like. Wearable devices are placed in these locations and will not be lost even if they are not worn for a long time. The set of security locations can be set by the user via a wearable device or a smart terminal associated with the wearable device. After obtaining the current geographic location of the wearable device, it is then determined whether the current geographic location is included in the set of security locations, and if not included, it indicates that the wearable device is in a vulnerable geographic location such as a public place.

At this time, it may be determined whether the unworn reminder condition is met by further determining whether the following conditions are met. In one case, when the unworn duration is greater than the set duration threshold, that is, the wearable device is not worn for a long time; in another case, when the currently-remaining power parameter value is less than the set power parameter threshold, the wearable device will shut down due to low battery at this time. In both cases, the wearable device may be determined to be lost, so when the above two conditions are met, it is judged that the unworn reminder condition is met.

The set duration threshold may be, for example, 30 minutes; the set power parameter threshold may be a set remaining power percentage or a currently-remaining power threshold, wherein the set remaining power percentage may be 20%. The specific values of these thresholds can be set according to the actual application scenario, or can be set by the user.

In an embodiment, determining whether the unworn reminder condition is met further includes: when the smart terminal associated with the wearable device exists, obtaining a distance between the wearable device and the associated smart terminal, and determining whether the distance is greater than a set distance threshold, and if yes, determining that the unworn reminder condition is met.

In an embodiment, to determine whether the unworn reminder condition is met, there is no need to obtain the usage status information of the wearable device, and it can be determined by the smart terminal associated with the wearable device. When the smart terminal is associated with the wearable device through a wireless connection such as Bluetooth or WIFI, the distance between the smart terminal and the wearable device can be obtained by means of the wireless connection. For example, the distance between the two is obtained by the strength of the Bluetooth, WIFI signals. When the distance between the two is greater than the set distance threshold, it is considered that the distance between the two is too far and there is a risk of losing the wearable device, that is, it is determined that the unworn reminder condition is met.

In an embodiment, determining that the wearable device is not worn by the user includes at least one of the following manners:

manner 1, determining that the wearable device is not worn by the user by determining that the fixing member of the wearable device is in an unfixed state;

manner 2, determining that the wearable device is not worn by the user by detecting that the fixing member of the wearable device is changed from a fixed state to the unfixed state;

manner 3, determining that the wearable device is not worn by the user by determining that a duration of the wearable device failing to acquire human body related data reaches a first time threshold;

manner 4, determining that the wearable device is not worn by the user by determining that a duration of the wearable device failing to acquire motion related data reaches a second time threshold.

In the first manner, whether the fixing member of the wearable device, such as a fastening device, is in the fastening state can be detected by a sensor on the fastening device, such as a watch band, a wrist band of the wearable device, to determine whether the wearable device is not worn by the user.

The second manner differs from the first manner in that when it is detected that the wearable device is taken off, it is determined that the wearable device is not worn by the user. For example, a sensor can be placed on the watch band of the smart watch, and can sense that the buckle and the watch hole on the band changes from the fastened state to the unfastened state. When the sensor senses the state transition described above, it is determined that the wearable device is not worn by the user.

In the third manner, the human body related data refers to the human body related data sensed when the wearable device is worn, and may include, for example, at least one of the following: heartbeat data, human body temperature data, blood pressure data, and the like. When the wearable device is able to sense human body related data, it indicates that it is being worn by the user.

In the fourth manner, the motion related data refers to related data generated by the wearable device due to movement, and may include, for example, at least one of the following: GPS mobile data, number of steps, and the like. When the wearable device is able to acquire the motion related data, it indicates that it is in a motion state, that is, it is in a motion state because it is worn by the user.

In some embodiments, the wearable device is worn by the user, but since the user is at rest and no motion related data is generated, the second time threshold can be set to a relatively long period to prevent misjudgment. Or, the fourth manner can be combined with other manners to improve the accuracy of the judgment.

In an embodiment, sending the unworn reminder message to the user includes at least one of the following:

manner 1, instructing the wearable device to send the unworn reminder message;

manner 2, determining whether there is a smart terminal associated with the wearable device, and if yes, instructing the smart terminal associated with the wearable device to send the unworn reminder message.

The unworn reminder message may be a voice reminder message, a text reminder message, an image reminder message, and/or a vibration reminder message. The wearable device may be instructed to send directly, or may be instructed to send when there is a smart terminal associated with the wearable device.

Figure 2:
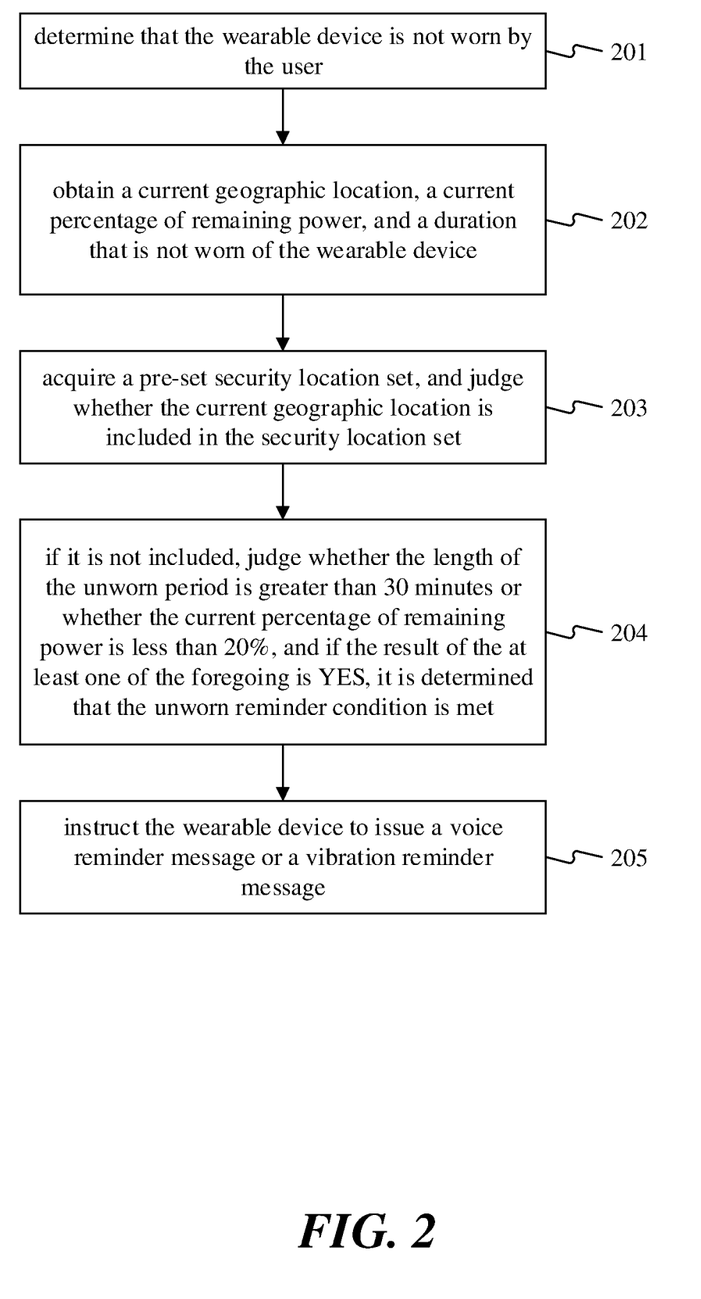
FIG. 2 is a flowchart of a method for providing a notification regarding a wearable device, according to an exemplary embodiment.

FIG. 2 shows a flow chart of a method for providing a notification regarding a wearable device, according to an embodiment. As shown in FIG. 2, the method includes the following steps.

In step 201, it is determined that the wearable device is not worn by the user. In this step, the determination may be made, for example, by the fixing member on the wearable device to detect that it is in an unfixed state.

In step 202, a current geographic location, a current percentage of remaining power, and a duration that the wearable device is not worn are acquired.

In step 203, a pre-set security location set is acquired, and it is judged whether the current geographic location acquired in step 202 is included in the security location set.

In step 204, if it is not included, it is judged whether the length of the unworn period is greater than 30 minutes or whether the current percentage of remaining power is less than 20%. If the judging result of the at least one of the foregoing is YES, it is determined that the unworn reminder condition is met.

In step 205, the wearable device is instructed to issue a voice reminder message or a vibration reminder message.

With the above method, when the wearable device is taken off in a public place and is not worn for a long time or the remaining power is low, the user may be given a reminder message to prevent the user from losing the wearable device in a public place.

Figure 3:
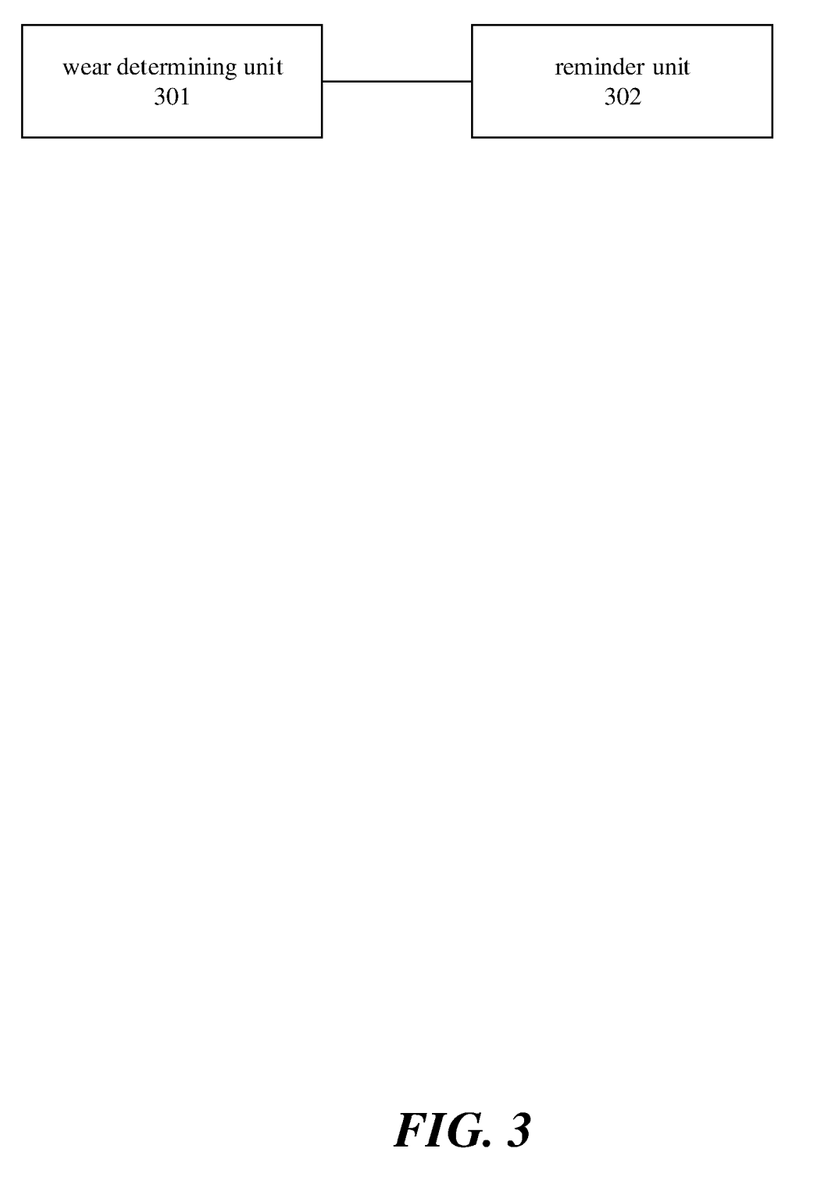
FIG. 3 is a block diagram of an apparatus for providing a notification regarding a wearable device, according to an exemplary embodiment.

FIG. 3 is a block diagram of an apparatus for providing a notification regarding a wearable device, according to an embodiment. As shown in FIG. 3, the apparatus includes: a wear determining unit 301 configured to determine that the wearable device is not worn by the user; a reminder unit 302 configured to send an unworn reminder message to the user if an unworn reminder condition is met.

In an embodiment, the reminder unit 302 further includes a condition determining unit configured to: obtain usage status information of the wearable device; determine that the usage status information meets the unworn reminder condition.

In an embodiment, the usage status information includes at least one of the following: a current geographic location, a currently-remaining power parameter value, and an unworn duration.

In an embodiment, the condition determining unit is further configured to: obtain a set of security locations and, when the set of security locations does not include the current geographic location, and when it is determined that the unworn duration is greater than the set duration threshold and/or when it is determined that the currently-remaining power parameter value is less than the set power parameter threshold, determine that the unworn reminder condition is met.

In an embodiment, the condition determining unit is further configured to: when there is a smart terminal associated with the wearable device, obtain a distance between the wearable device and the associated smart terminal, and if the distance is greater than the set distance threshold, determine that the unworn reminder condition is met.

In an embodiment, the wear determining unit 301 is further configured to determine that the wearable device is not worn by the user based on at least one of the following manners:

manner 1, in a case that the fixing member of the wearable device is in an unfixed state, determining that the wearable device is not worn by a user;

manner 2, determining that the wearable device is not worn by the user by detecting that the fixing member of the wearable device is changed from a fixed state to the unfixed state;

manner 3, in a case that a duration of the wearable device failing to acquire human body related data reaches a first time threshold, determining that the wearable device is not worn by the user;

manner 4: in a case that a duration of the wearable device failing to acquire motion related data reaches a second time threshold, determining that the wearable device is not worn by the user.

In an embodiment, the reminder unit 302 is configured to issue the unworn reminder message to the user in at least one of the following manners:

manner 1, instructing the wearable device to send the unworn reminder message;

manner 2: in the case that there is a smart terminal associated with the wearable device, instructing the smart terminal associated with the wearable device to send the unworn reminder message.

With regard to the above device embodiments, the specific manner in which the respective units perform the operations has been described in detail in the method embodiments, and will not be repeated herein.

With the technical solution provided by the embodiments of the present disclosure, once it is determined that the wearable device is not worn by the user, it is determined whether the reminder condition is met, and if the reminder condition is met, the user is sent a reminder message so as to prevent the wearable device being lost. Therefore, when the wearable device is taken off in a public place and is not worn for a long time or the remaining power is low, the wearable device is prevented from being left and lost in the public place by sending a reminder message to the user.

Figure 4:
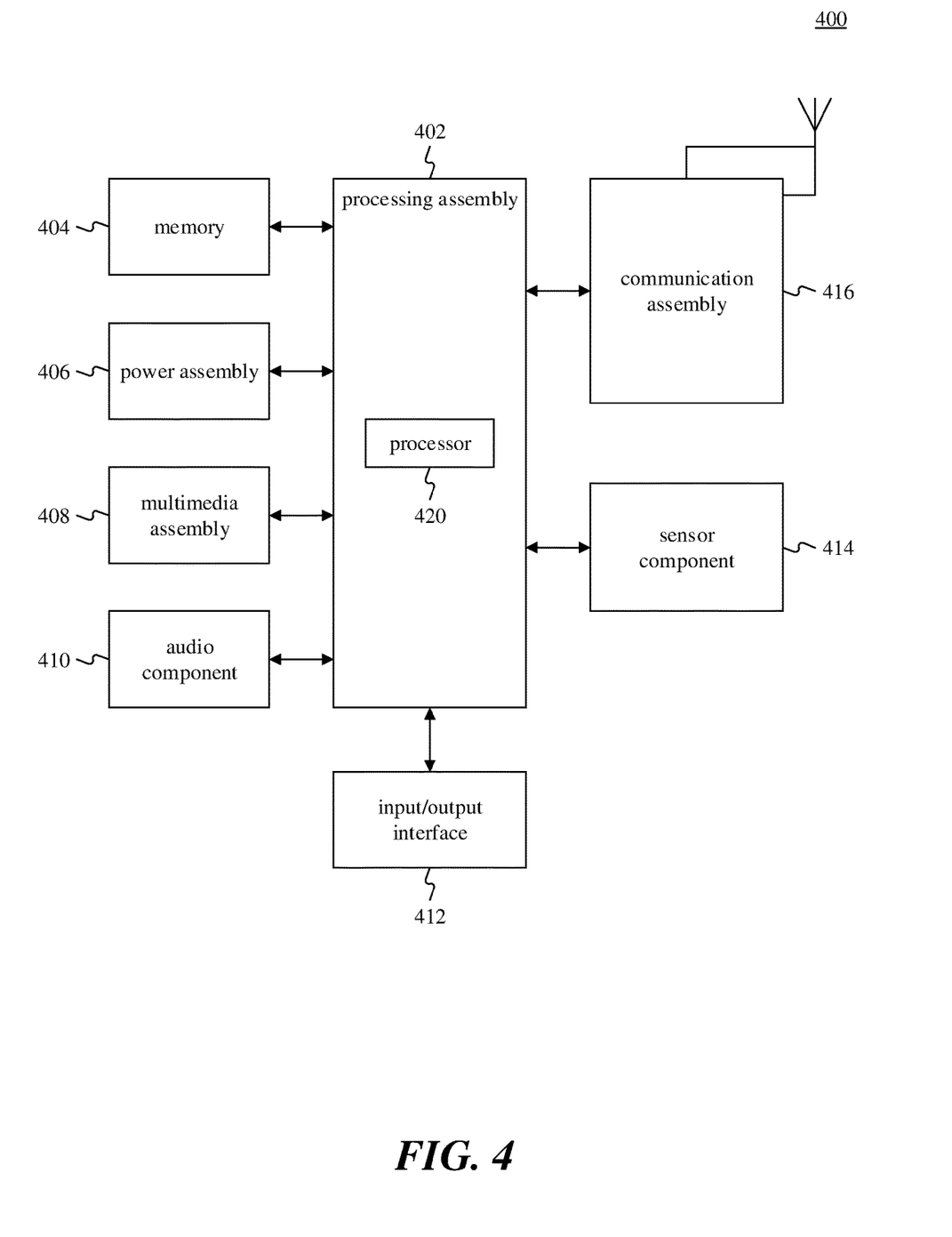
FIG. 4 is a block diagram of a device for providing a notification regarding a wearable device, according to an exemplary embodiment.

FIG. 4 is a block diagram of a device 400 for providing a notification regarding a wearable device, according to an exemplary embodiment. For example, the device 400 can be a mobile phone, a computer, a digital broadcast terminal, a messaging device, a gaming console, a tablet device, a medical device, a fitness device, a personal digital assistant, and the like.

Referring to FIG. 4, the device 400 can include one or more of the following components: a processing assembly 402, a memory 404, a power assembly 406, a multimedia assembly 408, an audio component 410, an input/output (I/O) interface 412, a sensor component 414, and a communication assembly 416.

The processing assembly 402 typically controls the overall operation of the device 400, such as operations associated with display, telephone calls, data communications, camera operations, and recording operations. The processing assembly 402 can include one or more processors 420 to execute instructions to complete all or part of the steps of the methods described above. Moreover, the processing assembly 402 can include one or more modules to facilitate interaction between the processing assembly 402 and other components. For example, the processing assembly 402 can include a multimedia module to facilitate interaction between the multimedia assembly 408 and the processing assembly 402.

The memory 404 is configured to store various types of data to support operations at the device 400. Examples of such data include instructions for any application or method operating on the device 400, contact data, phone book data, messages, pictures, videos, and the like. The memory 404 can be implemented by any type of volatile or non-volatile storage device, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, disk or optical disk.

The power assembly 406 provides power to various components of the device 400. The power assembly 406 may include a power management system, one or more power sources, and other components associated with generating, managing, and distributing power for the device 400.

The multimedia assembly 408 includes a screen between the device 400 and the user that provides an output interface. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touches, slides, and gestures on the touch panel. The touch sensor may sense not only the boundary of the touch or sliding action, but also the duration and pressure associated with the touch or slide operation. In some embodiments, the multimedia assembly 408 includes a front camera and/or a rear camera. When the device 400 is in an operation mode, such as a shooting mode or a video mode, the front camera and/or the rear camera can receive external multimedia data. Each front and rear camera can be a fixed optical lens system or have focal length and optical zoom capabilities.

The audio component 410 is configured to output and/or input an audio signal. For example, the audio component 410 includes a microphone (MIC) that is configured to receive an external audio signal when the device 400 is in an operational mode, such as a call mode, a recording mode, and a voice recognition mode. The received audio signal may be further stored in the memory 404 or transmitted via the communication assembly 416. In some embodiments, the audio component 410 also includes a speaker for outputting an audio signal.

The I/O interface 412 provides an interface between the processing assembly 402 and the peripheral interface module, which may be a keyboard, a click wheel, a button, or the like. The button may be, but are not limited to, a home button, a volume button, a start button, and a lock button.

The sensor assembly 414 includes one or more sensors for providing status assessment of various aspects to the device 400. For example, the sensor assembly 414 may detect an open/closed state of the device 400, a relative positioning of assembly, for example the assembly is a display and a keypad of the device 400, and the sensor component 414 may also detect a change in position of one assembly of the device 400 or the device 400, presence or absence of user contacting with the device 400, orientation of the device 400 or acceleration/deceleration, and temperature variation of the device 400. The sensor assembly 414 can include a proximity sensor configured to detect the presence of nearby objects without any physical contact. The sensor assembly 414 may also include a light sensor, such as a CMOS or CCD image sensor, for use in imaging applications. In some embodiments, the sensor assembly 414 may also include an acceleration sensor, a gyro sensor, a magnetic sensor, a pressure sensor, or a temperature sensor.

The communication assembly 416 is configured to facilitate wired or wireless communication between the device 400 and other devices. The device 400 can access a wireless network based on a communication standard, such as WiFi, 4G or 5G, or a combination thereof. In an exemplary embodiment, the communication assembly 416 receives broadcast signals or broadcast associated information from an external broadcast management system via a broadcast channel. In an exemplary embodiment, the communication assembly 416 also includes a near field communication (NFC) module to facilitate short range communication. In an exemplary embodiment, the communication assembly 416 can be implemented based on radio frequency identification (RFID) technology, infrared data association (IrDA) technology, ultra-wideband (UWB) technology, Bluetooth (BT) technology, and other technologies.

In an exemplary embodiment, the device 400 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic component implementations for performing the above methods.

In an exemplary embodiment, there is also provided a non-transitory computer readable storage medium comprising instructions, such as the memory 404 comprising instructions, which are executable by the processor 420 of the device 400 to perform the above described methods. For example, the non-transitory computer readable storage medium may be a ROM, a random access memory (RAM), a CD-ROM, a magnetic tape, a floppy disk, and an optical data storage device.

In an exemplary embodiment, there is also provided a non-transitory computer readable storage medium, when instructions in the storage medium are executed by a processor of a mobile terminal, enabling the mobile terminal to perform a method for providing a notification regarding a wearable device, the method comprising: determining that the wearable device is not worn by the user; sending an unworn reminder message to the user if an unworn reminder condition is met.

Figure 5:
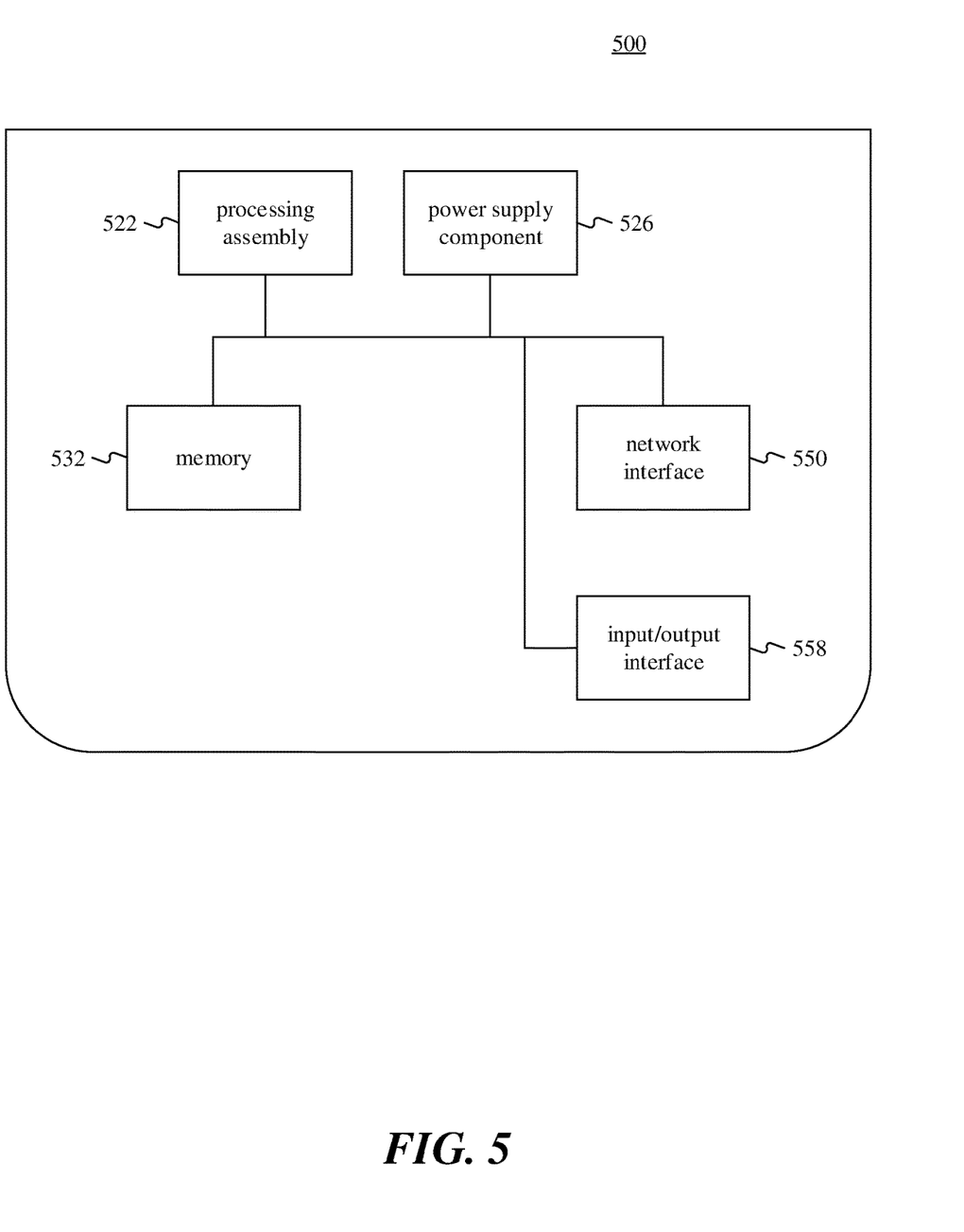
FIG. 5 is a block diagram of a device for providing a notification regarding a wearable device, according to an exemplary embodiment.

FIG. 5 is a block diagram of a device 500 for providing a notification regarding a wearable device, according to an exemplary embodiment. For example, the device 500 may be provided as a server. Referring to FIG. 5, the device 500 includes a processing assembly 522 that further includes one or more processors, and memory resources represented by a memory 532 for storing instructions, such as an application, executable by the processing assembly 522. An application stored in the memory 532 may include one or more modules each corresponding to a set of instructions. Further, the processing assembly 522 is configured to execute instructions to perform a method of determining that the wearable device is not worn by the user; and sending an unworn reminder message to the user if an unworn reminder condition is met.

The device 500 may also include a power supply component 526 configured to perform power management of the device 500, a wired or wireless network interface 550 configured to connect the device 500 to the network, and an input/output (I/O) interface 558. The device 500 may operate an operating system stored in the memory 532, such as Windows Server™, Mac OS X™, Unix™, Linux™, FreeBSD™ or the like.

Other embodiments of the present disclosure will be apparent to those skilled in the art after considering the description and implementing the disclosure. The present application is intended to cover any variations, uses, or adaptations of the present disclosure, which are in accordance with the general principles of the disclosure and include common general knowledge or common technical means in the art that are not disclosed in the present disclosure. The description and embodiments are to be regarded as illustrative only. The true scope and spirit of the disclosure is pointed out by the appended claims.

It is to be understood that the disclosure is not limited to the precise structure described in the above and illustrated in the drawings, and can make various modifications and changes without departing from the scope thereof. The scope of the disclosure is to be limited only by the appended claims.

What is claimed is:

1. A method for providing a notification, comprising:
   determining whether a wearable device is worn by a user;
   obtaining usage status information of the wearable device when the wearable device is unworn by the user;
   determining whether to send the notification based on the usage status information of the wearable device; and
   sending the notification when a predefined condition is met,
   wherein the usage status information of the wearable device comprises at least one of: a current geographic location of the wearable device, a currently-remaining power parameter value of the wearable device, or an unworn duration of the wearable device, and
   wherein determining whether to send the notification comprises:
   obtaining a set of security locations; and
   determining that the predefined condition is met when the current geographic location of the wearable device is out of the set of security locations and a currently-remaining power parameter value is less than a preset power parameter threshold.

2. The method of claim 1, further comprising:
   monitoring a biometric parameter to determine whether the wearable device is worn by a user.

3. The method of claim 1, wherein determining whether to send the notification comprises:
   obtaining the set of security locations; and
   determining that the predefined condition is met when the current geographic location of the wearable device is out of the set of security locations and the unworn duration of the wearable device is greater than a preset duration threshold.

4. The method of claim 1, wherein determining whether to send the notification comprises:
   when a smart terminal is connected to the wearable device, obtaining a distance between the wearable device and the smart terminal, and
   determining that the predefined condition is met when the distance is more than a preset distance threshold.

5. The method of claim 1, wherein determining whether the wearable device is worn by the user comprises at least one:
   detecting a usage status of a fixing member of the wearable device;
   detecting whether the usage status of the fixing member of the wearable device changes from a fixed state to an unfixed state;
   determining a duration of the wearable device failing to acquire human body related data; or
   determining a duration of the wearable device failing to acquire motion related data.

6. The method of claim 1, wherein sending the notification comprises at least one of:
   instructing the wearable device to send an unworn reminder message; or instructing a smart terminal connected to the wearable device to send the unworn reminder message.

7. An apparatus for providing a notification, comprising:
a processor; and
a memory storing instructions executable by the processor;
wherein the processor is configured to:
determine whether the wearable device is worn by a user;
obtain usage status information of a wearable device when the wearable device is unworn by the user;
determine whether to send the notification based on the usage status information of the wearable device; and
send the notification when a predefined condition is met,
wherein the usage status information of the wearable device comprises at least one of: a current geographic location of the wearable device, a currently-remaining power parameter value of the wearable device, or an unworn duration of the wearable device, and
wherein determining whether to send the notification comprises:
obtaining a set of security locations; and
determining that the predefined condition is met when the current geographic location of the wearable device is out of the set of security locations and a currently-remaining power parameter value is less than a preset power parameter threshold.

8. The apparatus of claim 7, wherein the processor is further configured to:
monitor a biometric parameter to determine whether the wearable device is worn by a user.

9. The apparatus of claim 7, wherein in determining whether to send the notification, the processor is further configured to:
obtain the set of security locations; and
determine that the predefined condition is met when the current geographic location of the wearable device is out of the set of security locations and the unworn duration of the wearable device is greater than a preset duration threshold.

10. The apparatus of claim 7, wherein in determining whether to send the notification, the processor is further configured to:
when a smart terminal is connected to the wearable device, obtain a distance between the wearable device and the smart terminal, and
determine that the predefined condition is met when the distance is greater than a preset distance threshold.

11. The apparatus of claim 7, wherein determining whether the wearable device is worn by the user comprises at least one:
detecting a usage status of a fixing member of the wearable device;
detecting whether the usage status of the fixing member of the wearable device changes from a fixed state to an unfixed state;
determining a duration of the wearable device failing to acquire human body related data; or
determining a duration of the wearable device failing to acquire motion related data.

12. The apparatus of claim 7, wherein sending the notification comprises at least one of:
instructing the wearable device to send an unworn reminder message; or
instructing a smart terminal connected to the wearable device to send the unworn reminder message.

13. A non-transitory computer readable storage medium having stored thereon instructions that, when executed by a processor of a device, cause the device to perform a method for providing a notification, the method comprising:
determining whether a wearable device is worn by a user;
obtaining usage status information of the wearable device when the wearable device is unworn by the user;
determining whether to send the notification based on the usage status information of the wearable device; and
sending the notification when a predefined condition is met,
wherein the usage status information of the wearable device comprises at least one of: a current geographic location of the wearable device, a currently-remaining power parameter value of the wearable device, or an unworn duration of the wearable device, and
wherein determining whether to send the notification comprises:
obtaining a set of security locations; and
determining that the predefined condition is met when the current geographic location of the wearable device is out of the set of security locations and a currently-remaining power parameter value is less than a preset power parameter threshold.

* * * * *